United States Patent [19]

Sullivan

[11] 3,937,259
[45] Feb. 10, 1976

[54] COLLECTION DEVICE
[76] Inventor: Philip E. Sullivan, 37 Valley View Drive, Farmington, Conn. 06032
[22] Filed: Oct. 15, 1974
[21] Appl. No.: 514,734

[52] U.S. Cl. .................... 141/98; 141/231; 214/85
[51] Int. Cl.² ............................................ B65B 1/04
[58] Field of Search ............ 141/108, 109, 231, 98; 294/55; 56/1; 214/85

[56] References Cited
UNITED STATES PATENTS
430,355  7/1890  Stone ................................. 141/108
2,508,699  5/1950  Welsh ................................. 141/108

Primary Examiner—Houston S. Bell, Jr.
Attorney, Agent, or Firm—Prutzman, Hayes, Kalb & Chilton

[57] ABSTRACT

Apparatus for facilitating the collection of debris comprises a ramp having a receiving end and a discharging end, a support for the ramp positions the receiving end adjacent the debris and elevates the discharge end, and a container for the debris is supported by the ramp support adjacent the discharge end for receiving debris, such as leaves, therewithin. The ramp and its support may comprise a unitary structure in one embodiment. In another embodiment, the debris container may comprise a cart, one or more walls of which may serve to support the ramp and the ramp may be detached therefrom or it may be pivotally supported thereby for rotation into position as a cover on the cart. The ramp, its support, and the debris container are constructed for portability and facile assembly and disassembly.

14 Claims, 7 Drawing Figures

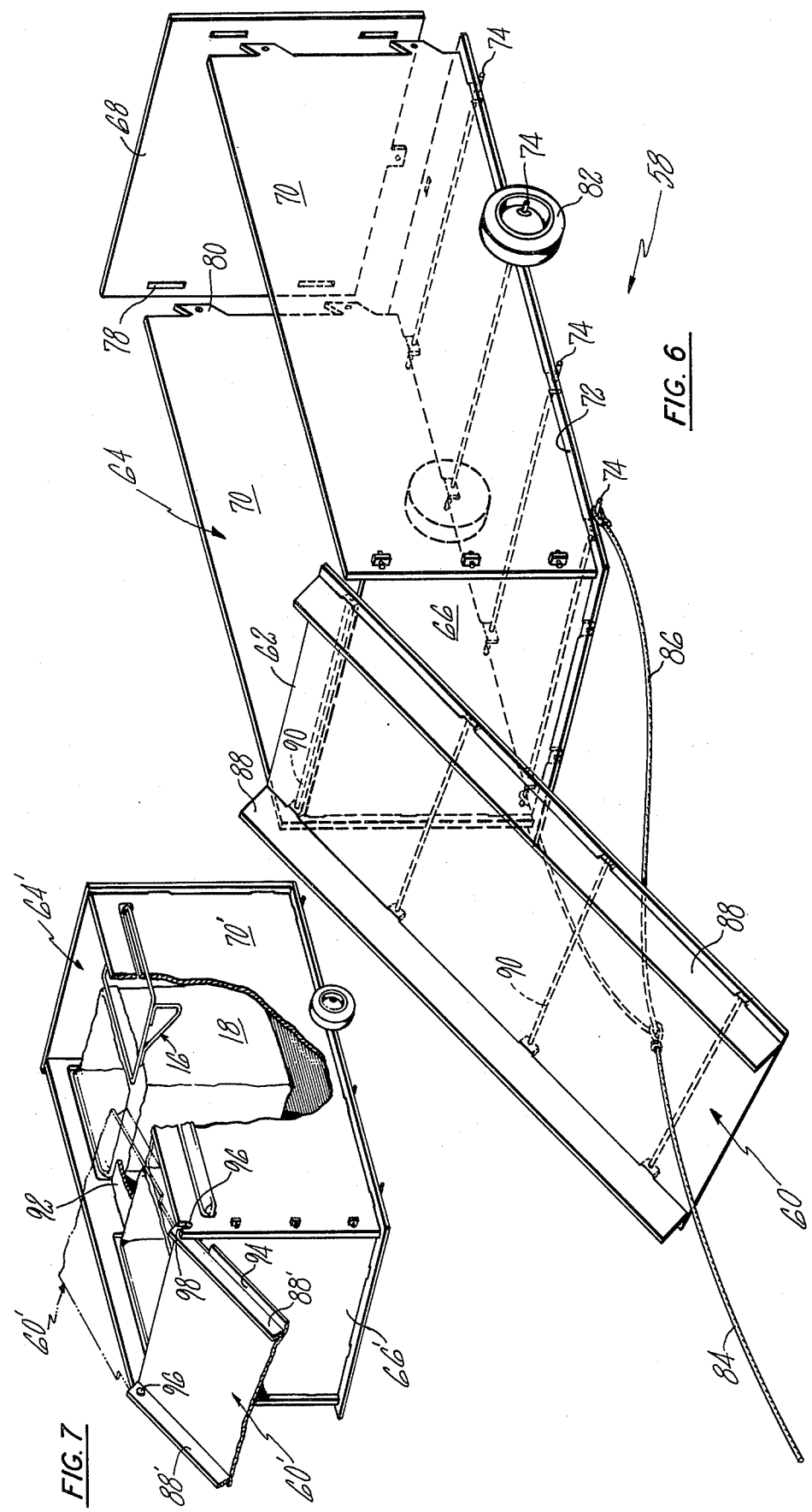

COLLECTION DEVICE

BACKGROUND OF THE INVENTION

The invention relates generally to apparatus for facilitating the collection of debris, such as leaves, and more specifically to a ramp and container combination.

The collection of various kinds of debris, such as fallen leaves and the like, for containment prior to subsequent disposal, is a chore which confronts many persons.

It is a primary object of the present invention to provide a debris collection device which facilitates the transfer of debris from a pile to a container.

It is an object of the invention to provide debris collection apparatus which permits transfer of debris without the need for bending or stooping.

Another object of the invention is the provision of a debris collection device which is readily mobile.

Still another object of the invention is the provision of collection apparatus which is easily assembled, disassembled and stored.

A still further object of the invention is the provision of a container which is easily completely filled.

Still further, another object of the invention is the provision of a container which is readily replaceable.

Another object of the invention is the provision of a collector suited to the storage of refuse.

SUMMARY OF THE INVENTION

According to the invention, there is provided apparatus for facilitating the collection of debris, such as leaves in a pile, which comprises, in combination, a ramp for the transfer of debris thereacross, the ramp having a receiving end and a discharge end; a support for the ramp to position it with said receiving end adjacent the pile of debris and the discharge end elevated; and a container is supported by the ramp support and positioned below the discharge end of the ramp for receiving debris discharged from the ramp.

The invention may be embodied in several different forms, each incorporating a ramp across which debris may be transferred, as from a pile, to an elevated position for discharge into an open-topped container, such as a bag. The apparatus is structured for facile assembly and disassembly and for mobility.

In one embodiment of the invention, a ramp is supported by a pair of panels on opposite sides thereof and connected to form a unitary structure. The panels additionally serve to support container-engaging frames from which open-topped containers may depend in debris-receiving orientation. The container-engaging frames, which may be plural in number, are preferably detachably supported by the panels or by supplemental supports in turn supported by the panels.

In another embodiment of the invention, there is provided a walled cart for receiving debris and a ramp is supported at its discharge end by one or more walls of the cart. The ramp may be detached from the cart or it may be pivotally supported thereby for rotation into position as a cart cover. The cart may include wheels positioned to permit one end of the cart to contact the ground and further may include one or more removable walls to facilitate the discharge of leaves therefrom. Container-engaging frames may be detachably supported by one or more of the walls of the cart and open-topped containers may depend therefrom within the cart for receipt of debris. To accommodate lateral expansion of the lower portions of the containers beyond the perimeter of the container-engaging frames, such frames may be spaced laterally from one another. A leaf shield may bridge the space between the frames to prevent leaves from falling therebetween.

BRIEF DESCRIPTION OF THE DRAWINGS

In the drawings:

FIG. 6 is a perspective view of another embodiment of the debris collector of the invention in which the container is a cart; and FIG. 7 is a perspective view of still another embodiment of the invention, somewhat similar to that of FIG. 6, showing the bag-like containers supported within the cart and the ramp pivotally supported by the cart for rotation between a debris transfer position and a cart cover position.

BRIEF DESCRIPTION OF THE PREFERRED EMBODIMENTS

It will be appreciated that while the invention is described as being suited for the collection of debris generally, it will find particular utility in the collection of leaves from piles on the ground.

Figure 1:
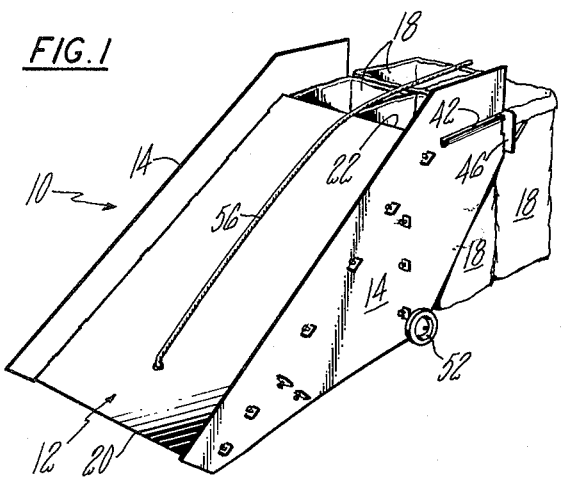
FIG. 1 is a perspective view of one embodiment of the debris collector of the invention.
Figure 2:
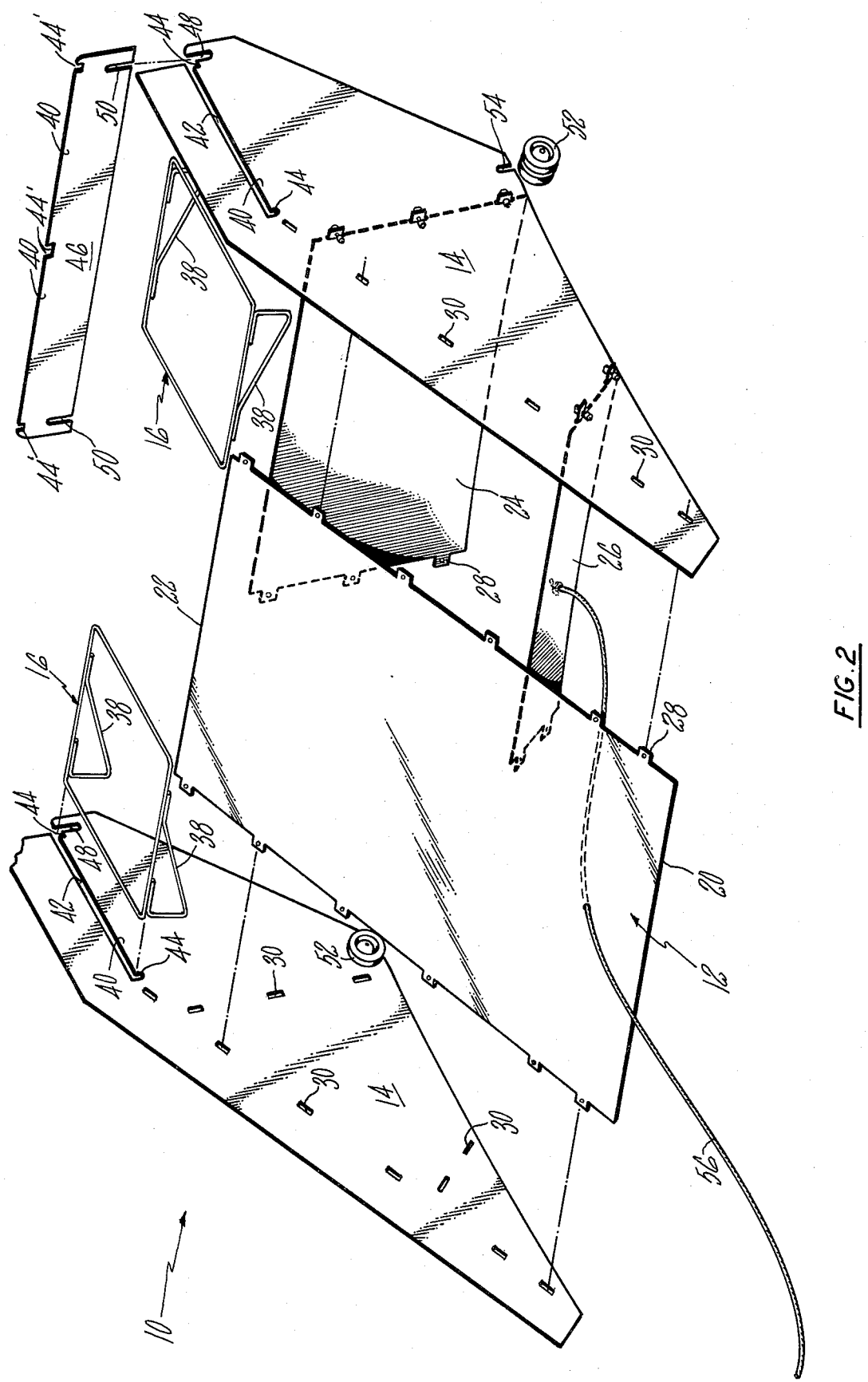
FIG. 2 is an exploded view of a debris collector similar to that of FIG. 1, showing but a pair of bag frames.

Referring now to FIGS. 1 and 2, there is depicted one basic embodiment of the invention. Debris collector 10 comprises a ramp 12 supported by and between a pair of panels 14 and includes container-engaging frames 16 supported thereby for supportively engaging one or more containers, such as bags 18. Ramp 12 and panels 14 are preferably substantially rigid sheets of some durable, lightweight, moisture resistant material, such as composition board or press board or the like. Ramp 12 has a smooth, planar upper surface to facilitate the transfer of debris thereacross, as by raking. The upper surface plane of ramp 12 is preferably rectangular, though an alternate, similar geometry might be substituted.

Ramp 12 is supported at both sides along its length by panels 14 which are intended to rest directly or indirectly on the surface supporting the pile of debris, usually the ground. Panels 14 each extend in spaced vertical planes and the ramp 12, or more specifically, its upper transfer surface, lies in a plane which is inclined to the ground and is perpendicular to both panels 14. The lower, or receiving end 20 of ramp 12 is closely adjacent, or may even be in contact with, the ground. The upper, or discharge end 22 of ramp 12 is supported several feet above ground level by panels 14. This elevation is designed to accommodate the placement of substantially fully-extended, open-topped containers, such as bags 18, closely below ramp discharge end 22. Ramp 12 will typically make an angle of 30°–45° with the ground.

Each panel 14 may be generally triangular in shape along the extent of ramp 12, with a bottom side which is intended to be slightly inclined to the ground and an upper side which substantially parallels the plane of ramp 12 several inches above it to define debris-retaining guide walls. Panels 14 extend beyond the discharge end of the ramp to provide support for frames 16 at a location beyond or "downstream" of the discharge end 22 of the ramp 12 in a manner to be later explained.

Additional lateral support may be provided to panels 14 below ramp 12 by spacer members 24 and 26 which extend between and are detachably connected to the panels. Both spacers 24 and 26 may be of the same material as ramp 12 and/or panels 14. Rear spacer 24 is located near the discharge end of the ramp with the forward spacer 26 being located nearer the receiving end.

Figure 3:
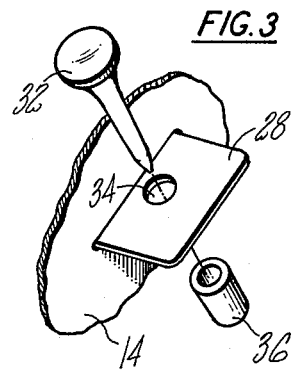
FIG. 3 is an enlarged view of a connector, including lock, for the debris collector.

Spacers 24 and 26 and ramp 12 are connected to panels 14 in a manner, best seen in FIG. 3, which facilitates assembly and disassembly of the structure. Ramp 12 and spacers 24 and 26 are each cut to include outwardly extending tabs 28 at the panel contacting sides. Similarly, the panel 14 have slots 30 cut or punched therefrom, each positioned and sized to receive a corresponding tab 28 in mated engagement. The tabs 28 are locked in mated engagement by means of a locking pin 32, such as a golf tee, which is inserted through a hole 34 in each tab 28 and is retained in that inserted position by a removable head 36, which may be a short piece of rubber hose or tubing.

Collector 10 is particularly suited to use open-topped bags as containers for receiving leaves and/or other debris. Bags 18 may be of generally any type and composition, though 30 gallon plastic bags are particularly suited to this use. A bag 18 is intended to be supported in an up-right open-mouthed orientation by frames 16. Each frame 16 is detachably supported, directly or indirectly, by one or both panels 14.

A rigid frame 16 may be formed of wire or metal rods or the like and have a shape and size which is substantially the same as the open mouth of a bag 18. A square or rectangular geometry provides optimum use of space in this instance. One side of frame 16 will be used for supported engagement with a panel 14, or the like, and might be partially discontinuous thereat. Further, rigid compressional support members 38 are provided to extend downwardly from the sides of frame 16 at an angle to contact a panel 14 or similar support. In the preferred embodiment, members 38 are joined to and form a rigid part of frame 16.

Figure 4:
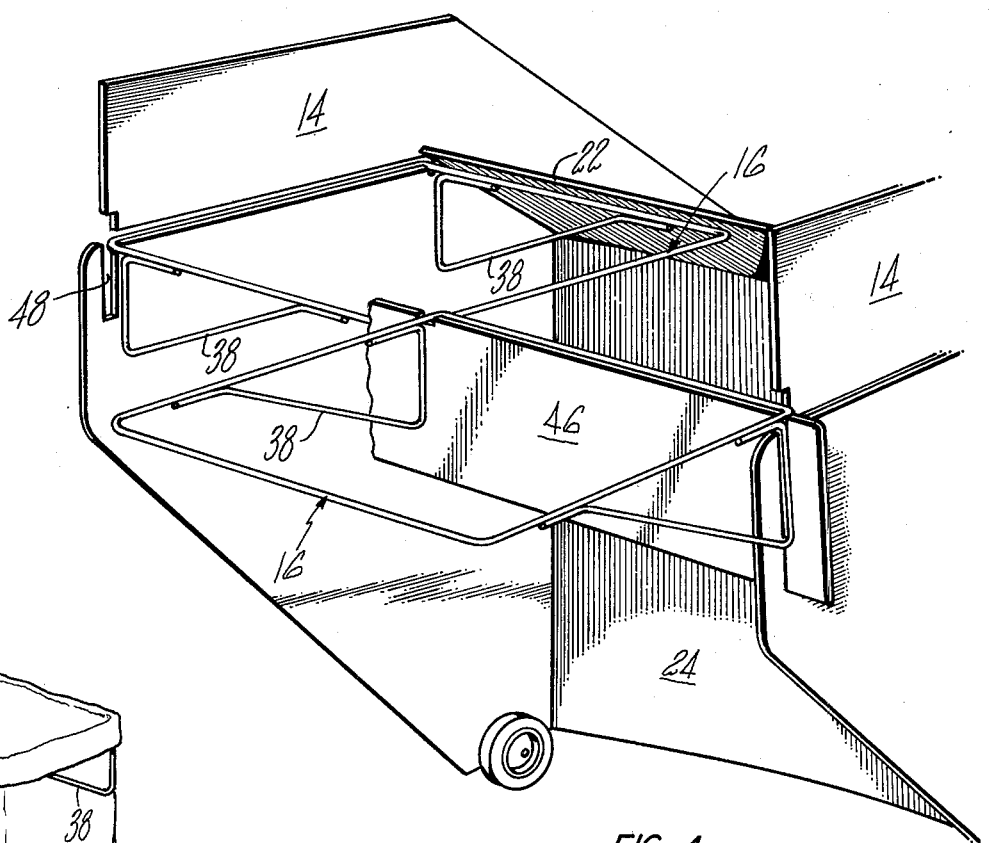
FIG. 4 is a perspective view, of part of the collector of FIG. 1, from the discharge end, showing the bag frames and the support therefor.

The embodiment depicted in FIGS. 1, 2 and 4 accommodates four bags 18, however, it will be appreciated that more or fewer bags might be similarly accommodated. In order to removably support two frames 16 that portion of each panel 14 extending beyond discharge end 22 of ramp 12 is provided with a tongue 40 which serves to at least partially support and lock frame 16 in horizontal cantilevered support with the panel. Tongues 40 are formed in each panel by providing a long horizontal opening or slot 42 therein near or somewhat below the level of discharge end 22 of the ramp and extending from adjacent the discharge end outward a sufficient distance to accommodate the width of a frame 16. A pair of vertical slots 44 through the panels 14 extend downward from slot 42 and are spaced and sized to receive the side arms of frame 16 therein, such that one side of the frame will be adjacent the discharge end 22 of ramp 12, as seen in FIG. 4. Slots 44 are of sufficient vertical extent to give tongue 40 created thereby sufficient height to contact and support the rear, or tongue-engaging, side of frame 16. The angle and length of support members 38 are such that frame 16 is oriented perpendicular to panel 14 in a horizontal position.

The spacing of panels 14 is designed to accommodate a frame 16 detachably mounted on each panel in opposed facing relation with little or no lateral space therebetween through which leaves may fall to the ground. In order to accommodate two additional frames 16, an additional frame support 46 extends between and is detachably connected to and supported by panels 14. Support 46 may also be a flat rigid material, such as that of the ramp and panels. Vertical slots 48 in panels 14, immediately rearward of slots 44, receive the ends of support 46 and mating vertical slots 50 therein for support by the panels. Two pairs of spaced vertical slots 44, similar to slots 44 in panels 14, create a pair of similar frame-supporting tongues 40 along the upper end of support 46. The additional frames 16 extend rearward or "downstream" in side-by-side relation from support 46 at the same elevation as the other two frames. This arrangement of four frames is compact, providing no space therebetween through which leaves may fall to the ground. A portion of the panels 14 downstream of the discharge end 22 of the ramp extend above it to provide guide walls to contain debris thereat.

Figure 5:
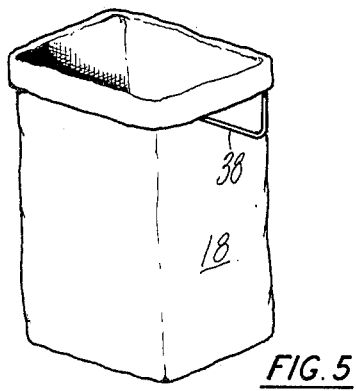
FIG. 5 is a view of a bag frame, detached from the ramp, and having a bag-type container engaged thereby.

A bag 18 is held in up-right orientation with its mouth open by engagement at its upper end with a frame 16, as seen in FIG. 5, in a manner well known for the support of such bags. The bag 18 will normally be in vertically supported contact with the ground at its bottom to accommodate the weight of debris.

As the debris collector 10 will usually be required to move from one pile of debris to another, it is provided with wheels 52 on each side. Wheels 52 may be housed in a vertical slot 54 in the bottom of a panel 14. Means may be provided to retain the wheels 52 in place relative to panels 14, or slots 54 may remain open as shown to permit simple removal of the wheels when the panels are lifted therefrom. Wheels 52 are positioned sufficiently rearward or "downstream" along the panels 14 that the forward end or portion of the panels and/or the receiving end 20 of the ramp will contact and be supported by the ground. This may be accomplished by positioning the wheels 52 rearward of the center of gravity of collector 10 with a location below the discharge end 22 of ramp 12 generally being satisfactory. This arrangement permits easy steering of collector 10 when it is being moved and provides good stability during the debris-loading operation.

A lifting and towing cable 56 transmits a lifting and/or towing force from the operator to collector 10 and, more specifically, panels 14 and wheels 52. Cable 56 is connected to front spacer support 16 and may extend forward, either under the receiving end 20 of the ramp or through a hole in ramp 10 near the receiving end as shown. Cable 56 may be extended rearwardly over the surface of ramp 12 while debris is being raked thereacross, as seen in FIG. 1, thus avoiding the need to bend and retrieve it each time. As the operator begins to walk with cable 56 in hand, the receiving end will lift clear of the ground and collector 10 will move forward.

In another basic embodiment of the invention, a debris or refuse collector 58, as seen in FIG. 6, comprises a ramp 60 supported near its discharge end 62 by one or more of the walls of a cart 64. Cart 64 includes a front wall 66, a rear wall 68 and a pair of side walls 70 supported on and detachably connected to a bottom or base member 72 to define an open-topped container. The walls and base of cart 64 are preferably of a rigid sheet-like material similar to that of panels 14 above. Each wall includes tabs along the bottom edge for detachable mating engagement with slots in base 72, as earlier described. Similar locking pins are used in some instances. Front wall 66 is also connected to side walls 70 in the same tab-in-slot manner. The connector tabs along the bottom edge of side walls 70 are retained in mating engagement by wooden or metal rods 74 extending from one side of cart 64 to the other and passing through holes in the tabs and held in position by locking heads, not shown, as described earlier. Rods 74 further serve to reinforce base 72.

Rear wall 68 is preferably removable from cart 64 to permit discharge of debris from the cart for disposal. Rear wall 68 includes vertical slots 78 at both sides thereof for mating engagement with tabs 80 which extend rearward and upward from the rear edge of side walls 70. Tabs 80 are inclined to assist in retaining rear wall 68 against side walls 70 and to facilitate entry of the bottom tab or tabs on rear wall 68 into the corresponding slots in base 72. Because of the angle of approach in this latter function, it may be desirable to make slots 78 longer than the simple vertical width of tabs 80. Locking pins might additionally be used to retain rear wall 68 in place.

Cart 64 preferably includes a set of wheels 82 at the sides thereof and positioned sufficiently rearward to permit the front end of the cart to contact and rest upon the ground, in the manner discussed earlier.

A cable 84 is connected to a yoke 86 which is connected to opposite ends of the forward-most rod 74 to transmit a lifting and/or towing force to cart 64.

Ramp 60 is functionally the same as ramp 12 of FIG. 1, however, it is not connected to cart 64. Ramp 60 is a rectangular, rigid sheet-like member, as earlier described. A pair of guide walls 88 extend along the length of the upper surface of ramp 60 near the sides thereof to prevent debris from falling off. Guide walls 88 are of a material similar to or the same as that of panels 14 and are connected to the ramp 60 with the tab and slot arrangement earlier described. Rigid rods 90 may extend beneath ramp 60 and through holes in corresponding tabs to secure them in place and to reinforce the ramp.

The receiving end of ramp 60 is positioned adjacent the debris to be moved and the discharge end 62 rests on top of front wall 66 of the cart. The top of front wall 66 is preferably somewhat lower than that of side walls 70, such that the latter provide lateral constraint to ramp 60. The discharge end 62 of the ramp extends slightly beyond front wall 66 such that debris is discharged from the ramp into the cart. When the cart is to be moved, the ramp 60 may be placed upon the debris in the cart or carried by the operator.

Reference is now made to FIG. 7 which depicts a modification of the FIG. 6 embodiment of the invention. Cart 64' of FIG. 7 is similar in most respects to cart 64 of FIG. 6 and only those points which differ will be discussed. Cart 64' includes several discrete containers for debris or refuse housed within the larger volume of the cart. These sub-containers and their supports are like those employed in the FIG. 1 embodiment and are given the same identifying numerals in FIG. 7.

A pair of locking tongues 40 are located in each side wall of cart 64' to permit a total of four bag frames 16 to be supported therein. Each frame 16 supportingly engages the top end of a bag 18. The bags often times are larger at the bottom than the top and in any event tend to bulge or expand laterally at the bottom such that they exceed the lateral bounds of the supporting frame 16. To accommodate this expanded configuration it is desirable to space at least some of the frames from each other. As seen in FIG. 7, the two forward-most frames 16 may be spaced from the two rear-most, providing the necessary space for bag growth. However, it is then desirable to position a shield 92 within or immediately over the space between frames 16 to prevent debris from falling into the space. Shield 92 may be any member or material which may be supported by the cart walls and/or frames 16 to prevent passage of debris. A rigid member supported in the tab-and-slot manner earlier described is satisfactory.

Ramp 60' associated with cart 64' is generally similar to ramp 60, however, ramp 60' is now in pivotally supported engagement with cart 64'. Ramp 60' may be pivotally supported by the side walls or front wall of cart 64; the former being described hereinafter. A variety of sidewall-supported pivots might be employed to support ramp 60' near its discharge end 62'. One technique, shown in FIG. 7, would provide a ramp 60' having a width somewhat greater than that of the spaced sidewalls of cart 64'. The guide walls 88' would be positioned such that they were laterally inside the inner faces of the cart sidewalls, thus creating a lip 94 at the side edges of ramp 60'. Lip 94 would be cut away over the final few inches of the ramp at the discharge end 62' to clear the cart sidewalls when the ramp is pivoted.

A vertical slot or notch 96 is cut in the upper edge of each sidewall 70' closely adjacent front wall 66'. Each slot 96 provides a seat for a pivot pin 98 which extends therethrough and through a hole in guide wall 88' adjacent discharge end 62' of the ramp. Pivot pins 98 may be wooden dowels, metal rods or bolts, or the like. Appropriate retaining means are detachably located on the ends of pins 98 to maintain them in position.

With the above arrangement, pivotal rotation of ramp 60' about the longitudinal axes of pins 98 is possible, thereby permitting the ramp to be moved from a leaf transferring position to one in which lip 94 rests on the top edges of sidewalls 70' to form a cover or top for cart 64'. For this reason, it is preferable that ramp 60' be as long or longer than cart 64'.

The use of open slots 96 permit ready separation of ramp 60' from cart 64', however, it will be appreciated that closed holes might be substituted for slots 96 if greater captivity and/or support is required for pivot pins 98. Further, a ramp might be provided having a width slightly less than the spacing of the sidewalls to permit it to be rotated to a position between, rather than on, the sidewalls. The ramp-become-cover would rest on the contents of the cart.

In each of the above described embodiments, the operator would position the collector, and more specifically, the receiving end of the ramp, adjacent the pile of debris and a moving implement, such as a rake, would than be used to move the debris upwardly along the ramp to the point of discharge into the waiting container.

Alternate preferred embodiments of the invention have been shown and described by way of example only and obviously many variations and modifications may be made therein without departing from the spirit of the invention. The invention, therefore, is not limited to any specified form or embodiment except insofar as such limitations are set forth in the appended claims.

What is claimed is:

1. Apparatus for facilitating the collection of debris, such as a pile of leaves, comprising, in combination, a ramp for the transfer of debris thereacross from a receiving end to a discharge end; a support for said ramp to operatively position said receiving end adjacent said debris and relatively elevate said discharge end for the transfer of debris upwardly across said ramp to said discharge end in response to a raking motion; and a container supported by said support and positioned below said discharge end of said ramp during said operative positioning of said ramp for the transfer of debris thereacross for receiving debris discharged therefrom.

2. The apparatus of claim 1 wherein said ramp and said ramp support are connected in fixed relationship to form a unitary structure.

3. The apparatus of claim 1 wherein said ramp supporting means comprise a pair of substantially rigid and upwardly extending panels engaging and supporting said ramp proximate the opposite sides thereof.

4. The apparatus of claim 3 wherein said panels and said ramp include cooperating tabs and slots for detachable mated engagement; and including means for releaseably locking said tabs in said mated engagement.

5. The apparatus of claim 3 wherein said container is supported by a frame, said frame being detachably supported by a said panel.

6. The apparatus of claim 5 wherein said panels extend beyond teh discharge end of said ramp and each include a support tongue thereat; and said frames are plural, each comprising a rigid horizontal frame including a tongue engaging portion and a downwardly extending compressional support member for cantilevered support with a said panel and locking tongue.

7. The apparatus of claim 5 wherein a frame support extends between and is supported by said panels and a said frame is detachably supported thereby.

8. The apparatus of claim 3 including wheel means supporting said panels and positioned such that a portion of each said panel adjacent said ramp at its receiving end is normally in direct contact with the ground; and further including means operatively connected to said panels for transmitting a force to lift said panel portions from said direct contact with the ground and to move said collection apparatus across the ground.

9. The apparatus of claim 8 including a substantially rigid spacer member extending between and connected to said panels below said ramp and intermediate said wheel means and said ground-contacting panel portions; and said force transmitting means comprise a cable connected to said spacer member.

10. The apparatus of claim 1 wherein said container for receiving debris comprises a walled, open-topped cart; said ramp support includes a wall of said cart; and said ramp is supported near said discharge end by and is movable relative to said wall of said cart.

11. The apparatus of claim 10 wherein said cart includes wheels for rolling support thereof, said wheels positioned to normally permit direct contact of an end of said cart with the ground; and means connected to said cart for transmitting a lifting and towing force thereto.

12. The apparatus of claim 10 wherein said cart includes a bag frame supported by a wall thereof and positioned within said cart below said discharge end of said ramp; and an open-topped bag detachably depending from said frame for receiving debris discharged from said ramp.

13. The apparatus of claim 10 wherein said cart comprises four upwardly extending walls defining an opening; said ramp has substantially the same size and shape as said cart opening; and said ramp is pivotally supported near its said discharge end by a said wall of said cart for rotation of said receiving end of said ramp into proximity with the upper end of said walls to form a cover for said cart.

14. An apparatus for facilitating the collection of debris from the ground and structured for facile assembly and disassembly comprising, in combination, a ramp having a smooth planar upper surface for the transfer of debris thereacross between a receiving end and a discharge end; a rigid support engaging said ramp to operatively position said receiving end adjacent the ground and said discharge end relatively above the ground whereby debris may be transferred upwardly across said ramp to said discharge end in response to a sweeping action; and a container positioned below said discharge end of said ramp for receiving therewithin said debris transferred across said ramp.

\* \* \* \* \*